(12) United States Patent
Bratsos et al.

(10) Patent No.: US 6,766,315 B1
(45) Date of Patent: Jul. 20, 2004

(54) METHOD AND APPARATUS FOR SIMULTANEOUSLY ACCESSING A PLURALITY OF DISPERSED DATABASES

(76) Inventors: Timothy G. Bratsos, 947 Wisconsin St. #2, San Francisco, CA (US) 94105; Peter J. R. Bonney, 1404 Sanchez St., San Francisco, CA (US) 94107; Lynn W. Barr, 7 Shratton Ave., San Carlos, CA (US) 94070

( * ) Notice: Subject to any disclaimer, the term of this patent is extended or adjusted under 35 U.S.C. 154(b) by 179 days.

(21) Appl. No.: 09/704,234

(22) Filed: Nov. 1, 2000

Related U.S. Application Data

(60) Provisional application No. 60/083,856, filed on May 1, 1998.

(51) Int. Cl.[7] .............................................. G06F 17/30
(52) U.S. Cl. ................................. 707/3; 707/7; 707/10
(58) Field of Search ..................... 707/1–10, 100–104.1

(56) References Cited

U.S. PATENT DOCUMENTS

| | | | | |
|---|---|---|---|---|
| 5,710,918 A | * | 1/1998 | Lagarde et al. ................ | 707/10 |
| 5,721,908 A | * | 2/1998 | Lagarde et al. ................ | 707/10 |
| 5,761,663 A | * | 6/1998 | Lagarde et al. ................ | 707/10 |
| 5,793,964 A | * | 8/1998 | Rogers et al. ............... | 709/202 |
| 5,848,410 A | * | 12/1998 | Walls et al. .................... | 707/4 |
| 5,875,446 A | * | 2/1999 | Brown et al. ................... | 707/3 |
| 5,895,470 A | * | 4/1999 | Pirolli et al. ................. | 707/102 |
| 5,974,441 A | * | 10/1999 | Rogers et al. ............... | 709/200 |
| 6,006,217 A | * | 12/1999 | Lumsden ........................ | 707/2 |
| 6,014,639 A | * | 1/2000 | Fohn et al. ................... | 705/27 |
| 6,014,665 A | * | 1/2000 | Culliss .......................... | 707/5 |
| 6,128,613 A | * | 10/2000 | Wong et al. .................... | 707/7 |
| 6,321,228 B1 | * | 11/2001 | Crandall et al. .............. | 707/10 |
| 6,389,436 B1 | * | 5/2002 | Chakrabarti et al. ........ | 707/513 |
| 2001/0044901 A1 | * | 11/2001 | Grawrock ................... | 713/189 |

* cited by examiner

*Primary Examiner*—Greta Robinson
*Assistant Examiner*—Linh Black
(74) *Attorney, Agent, or Firm*—Reed Smith Crosby Heafey LLP; Nathan P. Koenig

(57) ABSTRACT

A method and apparatus for intelligent Internet searching, the apparatus residing as a software application on a user's computer (the client). A single subject database of sources of directly and indirectly accessible content is stored on the client and accessed by the application. The database also necessary information for searching each source. Preferably, the database is updated at a regular interval. Multiple simultaneous hidden database searches may be performed by the application by linking the client to the appropriate database access pages on the network and forwarding the user's desired search information. Preferably, search results are updated and compared to highlight new information.

6 Claims, 6 Drawing Sheets

| Dialog Title | Id | Description |
|---|---|---|
| Splash screen | C100 | Application splash screen. Displays until application has loaded. |
| Expiration Splash screen | C200 | Displays immediately after appplication has completed loading. Contains product name, version, and expiration date. |
| Main dialog | C300 | Main application dialog. |
| Main dialog, top section | C310 | Topmost portion of Main application dialog. |
| Main dialog, Tools submenu | C312 | Tools submenu of Main application dialog. |
| Main dialog, Help submenu | C314 | Help submenu of Main application dialog. |
| Main dialog, Category windows | C320 | Category windows of Main application dialog. |
| Main dialog, Category/Bookmarks windows | C322 | Category/Bookmarks windows of the Main application dialog. |
| Main dialog, Bookmark Actions submenu | C324 | Bookmark Actions submenu of the Main application dialog. |
| Main dialog, Site Description window | C330 | Site Description windows of Main application dialog. |
| Main dialog, Site Description/Bookmarks window | C332 | Bookmark Provider windows of the Main application dialog. |
| Main dialog, Search Results window | C340 | Search Results windows of Main application dialog. |
| Search Results window submenu | C345 | Search Results windows submenu. |
| E-mail Search Results dialog | C347 | E-mail Search Results dialog. |
| Site Monitor Schedule dialog | C370 | Used to schedule Site Monitors. |
| Site Monitor, Custom Schedule dialog | C373 | Used to schedule Site Monitors for specific dates/times. |
| Site Monitor, E-mail Notification Options dialog | C375 | Used to set e-mail notification options for a monitored site. |
| Export Bookmarks dialog | C380 | Used to Export a bookmark Folder or a single resource. |
| Import Bookmarks dialog | C390 | Used to Import bookmarks. |
| Setup dialog | C400 | Main setup dialog. |
| Configure Proxies dialog | C425 | Reached from Setup dialog, configures proxies. |
| Configure Cache dialog | C450 | Reached from Setup dialog, configures cache for multi-user operation. |
| Registration dialog | C500 | Reached from Setup dialog and at start up (if registration id has expired), allows entry of a new registration id. |
| Find dialog | C600 | Locate resources based on keywords. |
| About dialog | C700 | About dialog. |
| How To Use Citeline dialog | C800 | Dialog with quick help on how to use CiteLine. |
| How to Contact Citizen 1 dialog | C850 | Dialog listing phone numbers and addresses for Citizen 1 offices. |
| Toolbar dialog | C900 | Used for navigating and viewing search results. |

FIG. 6

METHOD AND APPARATUS FOR SIMULTANEOUSLY ACCESSING A PLURALITY OF DISPERSED DATABASES

This application claims the benefit of provisional application Ser. No. 60/083,856 filed May 1, 1998.

FIELD OF THE INVENTION

The present invention is related generally to the field of database searching, and more specifically to simultaneous searching for data across a wide area network such as the Internet, the network including a plurality of clients and servers and a plurality of databases.

BACKGROUND OF THE INVENTION

A wide area computer network, or WAN, comprises a geographically disperse, interconnected plurality of computers capable of sharing data and/or processing capacity. The Internet is the world's largest WAN, growing at an annual rate some estimate to be above one thousand percent. In March of 1998, there were an estimated 320 million pages of information posted on the World Wide Web (the graphics-capable portion of the Internet), with uncounted millions of gigabytes of additional information stored in non-Web based, though Web accessible, databases. For the purpose of describing the present invention, information obtained through the Web, for example presented in Hyper Text Markup Language (HTML) and available at a consistent Uniform Resource Locator (URL) is within the "visible" web and is termed "directly accessible." Conversely, information accessible only via access to a distinct portal or other electronic doorway (even if such a portal or doorway is found on the Web) is within the hidden or "invisible" web and is termed "indirectly accessible." While there are numerous search engines and "web crawlers" that may be used to search for directly available data on the visible web, there is presently no singular source for accessing the indirectly available information on the hidden web. The present invention addresses the need for an efficient method of finding data on a large scale WAN such as the Internet, including the visible and hidden portions of the World Wide Web, and the need to efficiently update found information as content evolves and grows.

A number of challenges face the computer user accessing the Web and attempting to locate information about any particular subject matter. First, the immensity of the visible Web makes sorting through data found through currently available search engines difficult and time consuming. Second, found data may include a substantial quantity of material not related to the sought-after material, but discovered anyway through simple boolean word association or other search mechanisms known to those skilled in the art to which the present invention pertains. Third, there is no available mechanism for conducting a single search that accesses a plurality of hidden web databases. The user must instead browse to the proper database access page and provide a boolean or other description of the desired information, in a manner which is redundant when performed in addition to a similar exercise required for searching the visible web. Finally, it would be helpful to provide the user the means to update a search of both the visible and hidden webs as they grow, without requiring the user to repeat already executed search steps. Moreover, the user would be well-served by a mechanism for differentiating between newly found data and data previously discovered and analyzed by the user.

SUMMARY OF THE INVENTION

To address the shortcomings of the available art, the present invention provides an intelligent WAN searching apparatus which resides on a user's computer. A single subject database (e.g., a healthcare database), or a plurality of single subject databases, are stored on the client and accessed by the application. The majority of the single subject database entries comprises a hierarchical listing of hidden web databases, all entries being organized by subject matter and each including a description of database content and a search term entry interface customized for the particular database access page format. A user may establish a single query that the application then broadcasts to each desired hidden database to obtain indirectly accessible information. The results of the query are cached on the user's computer and displayed, preferably in HTML format. There are also listings in the database which provide an interface to search engines hosted at a dedicated search server. Each of these search engines includes a subject matter-limited listing of visible web sites that are particularly relevant to the database=s subject. Thus, the user's query can be broadcast through the dedicated search server to obtain directly accessible information from the visible web. The search results of the visible web sites can then be displayed in HTML format similar to the results of hidden web searches. Each database is preferably updated at a regular interval, such as monthly or weekly, via remote download from a server on the WAN, or by other data transport means.

A plurality of simultaneous hidden database searches may be performed by the client application to the extent connection bandwidth is available for linking the client to the appropriate database access pages and forwarding the user=s desired search information. Preferably, search results from both hidden and visible web searches are cached on the user=s computer for comparison to newly found search results, allowing for easy sorting of new and old data and differentiated display to the user. Desired keywords are preferably cached and shared among database search interfaces.

BRIEF DESCRIPTION OF THE DRAWINGS

The aforementioned advantages of the present invention as well as additional advantages thereof will be more clearly understood hereinafter as a result of a detailed description of a preferred embodiment of the invention when taken in conjunction with the following drawings.

FIG. 6 is a listing of the main dialogs offered in one embodiment of the invention.

Figure 1:
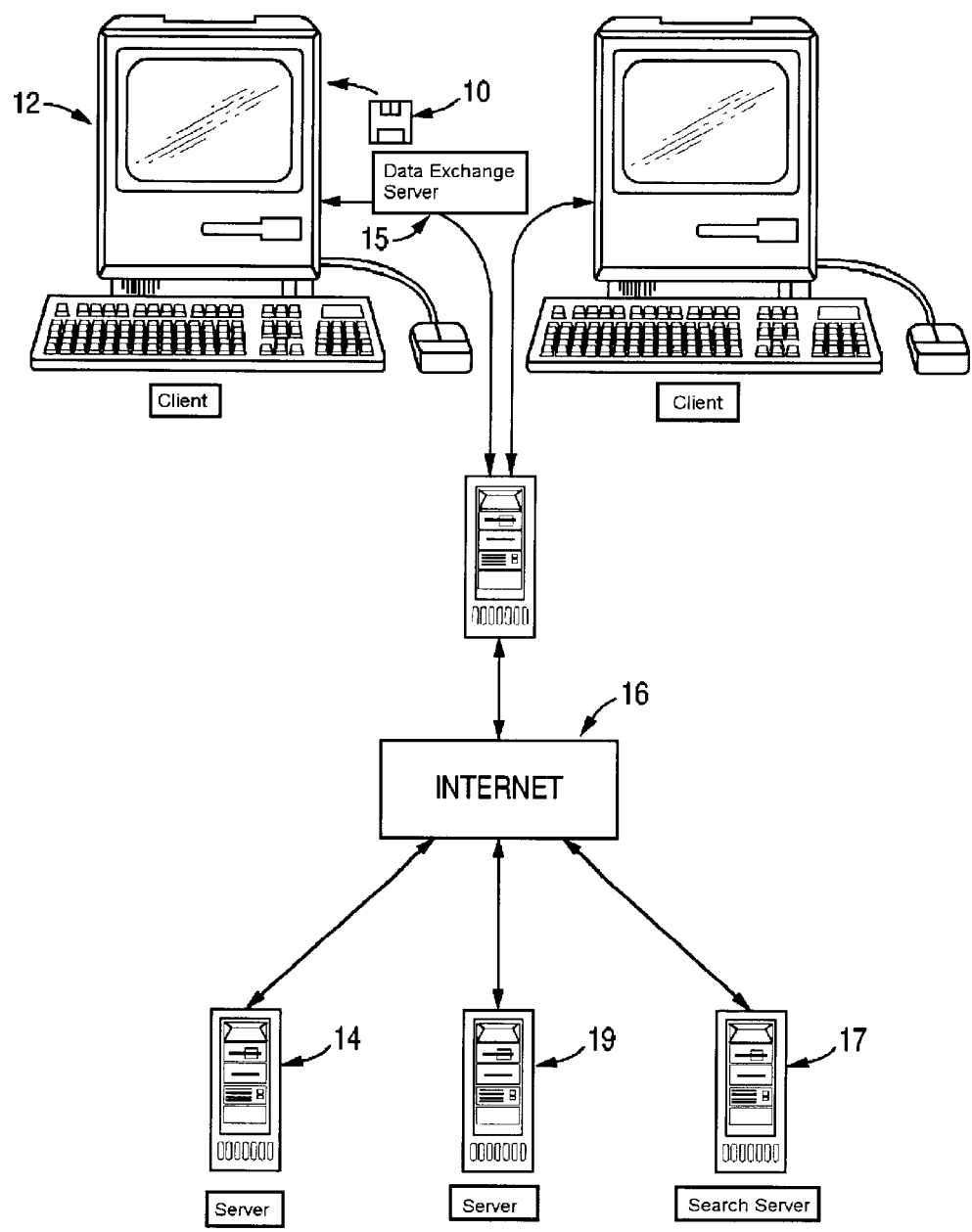
FIG. 1 illustrates a wide area computer network environment in which the method and system of the present invention may be utilized.

While the invention is susceptible to various modifications and alternative forms, specific embodiments thereof have been shown by way of example in the drawings and description. It should be understood, however, that the detailed description is not intended to limit the invention to the particular forms disclosed. On the contrary, the intention is to cover all modifications, equivalents, and alternatives falling within the spirit and scope of the invention as defined by the appended claims.

DETAILED DESCRIPTION OF A PREFERRED EMBODIMENT

Figure 2:
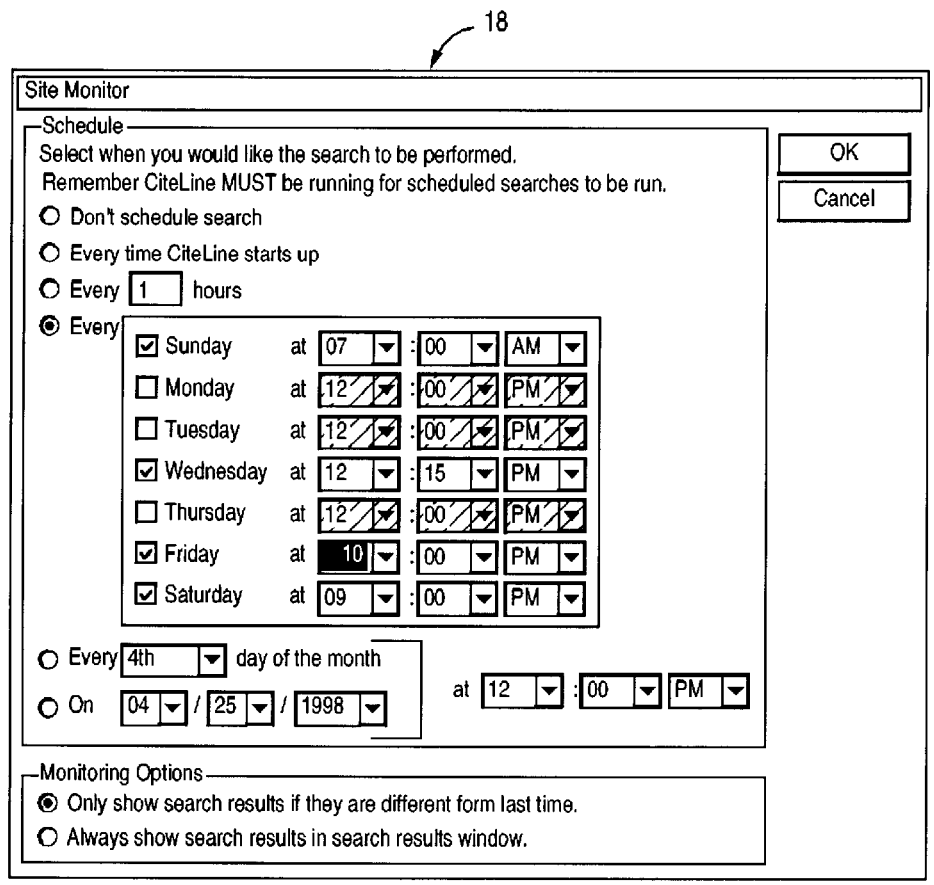
FIG. 2 illustrates a user interface for use with the present invention.

Referring to FIG. 1, the present invention is preferably implemented as a software application 10 executed at least primarily by a client computer 12 connected to a wide area network 16 (such as the Internet) including a plurality of client computers and server computers 14. Application 10 stores and accesses at least one single subject database. The majority of the single subject database entries comprise hierarchical listings of hidden web databases or sources, all entries being organized by subject matter and each including a description of database content, URL information to locate the database and a search protocol for the database, such as a term entry interface customized for the particular database access page format. Application 10 obtains indirectly accessible information by issuing queries to the listed hidden web databases. The single subject database entries also comprise listings for search engines hosted at a dedicated search server 17. By routing queries through the dedicated search server, application 10 obtains directly accessible information from the visible web. Application 10 also provides a timing interface 18, illustrated in FIG. 2, for the user to set times (such as by the hour or the day of the week) for the client to monitor the results of a specific hidden web database or visible web query (preferably executed through the search engine provided by client 12 for the desired hidden database or databases, or the user's desired visible web search terms).

Client 12 preferably stores the user's preferred monitoring schedule on a hard drive or similar stable memory local to the client and checks the schedule every time client application 10 is activated, as well as at predetermined intervals (e.g., every 15 minutes) thereafter while application 10 is activated. If a schedule check reveals query results are due to be monitored, client 12 obtains indirectly accessible information by sending the user's desired query to the desired sites from the database and directly accessible information by sending the query to the search engine server dedicated to a specific group of visible web sites, and retrieves the results. Client 12 is then preferably directed by application 10 to compare new results to previously retrieved results using a difference algorithm, and to display the difference in HTML format on a current results viewing page. In the case of a visible web query, a server 17 dedicated to visible web search functions (hosted by a service provider such as Citizen 1, Inc., the assignee of the present invention) is preferably directed by client 12 to do a previous and current results comparison and send an HTML-formatted results page to client 12 for display to the user. In the alternative, such comparisons may be accomplished exclusively on client 12 or by the client and server in combination.

Figure 3:
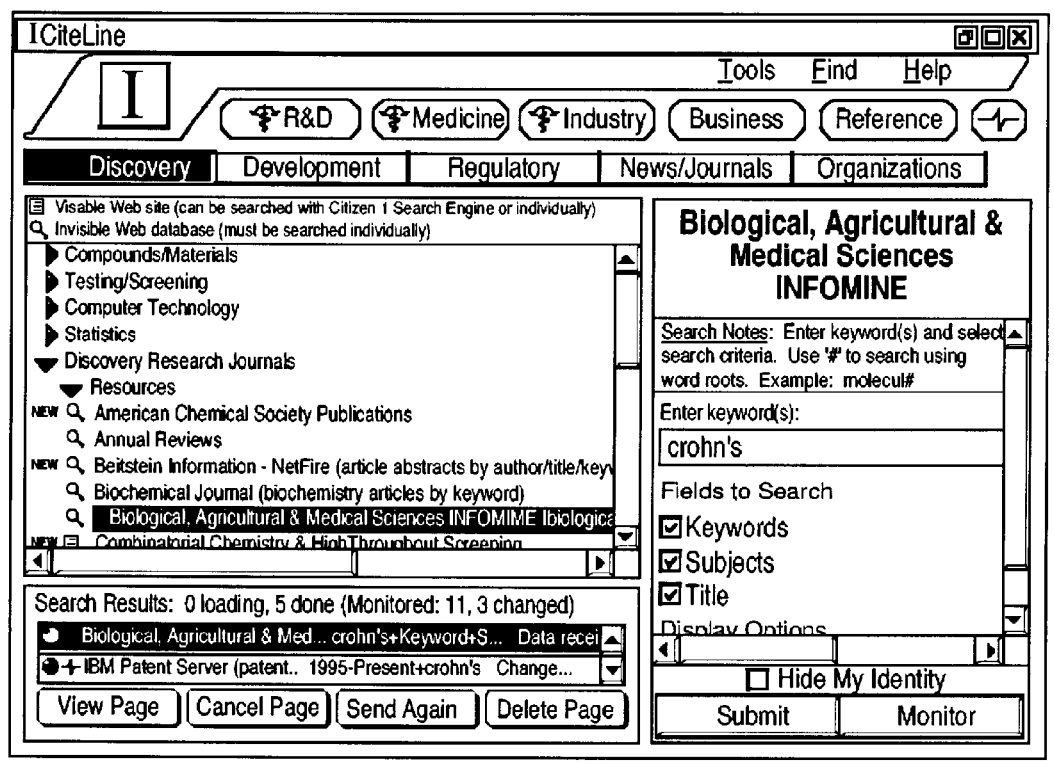
FIG. 3 illustrates a hidden database user interface as utilized with the present invention.

The process of query comparison and difference display for hidden web databases preferably begins with monitor set-up. The user preferably schedules monitor times via interface 18 after viewing results of an initial query, or before sending an initial query. If a particular query has not already been executed, client formats and sends the query to a database server at the next desired time interval. A database query for the term "Crohn's" is illustrated in FIG. 3. There may be fewer queries made than requested by the user if the number of sites set to be monitored at a given time exceeds the available bandwidth of the data exchange connection 15 between client 12 and network 16, but as many queries as possible will be made at any given time according to system capability. Preferably, the software is configured so that any queries not performed at a given monitoring time due to bandwidth and time constraints will be queued for execution at the next available opportunity, such as the next time application 10 is run, whether or not a scheduled monitoring event is due. Client 12 then retrieves the query results, preferably in HTML format, and provides a mechanism to the user to view these results within a Web browser.

Figure 4:
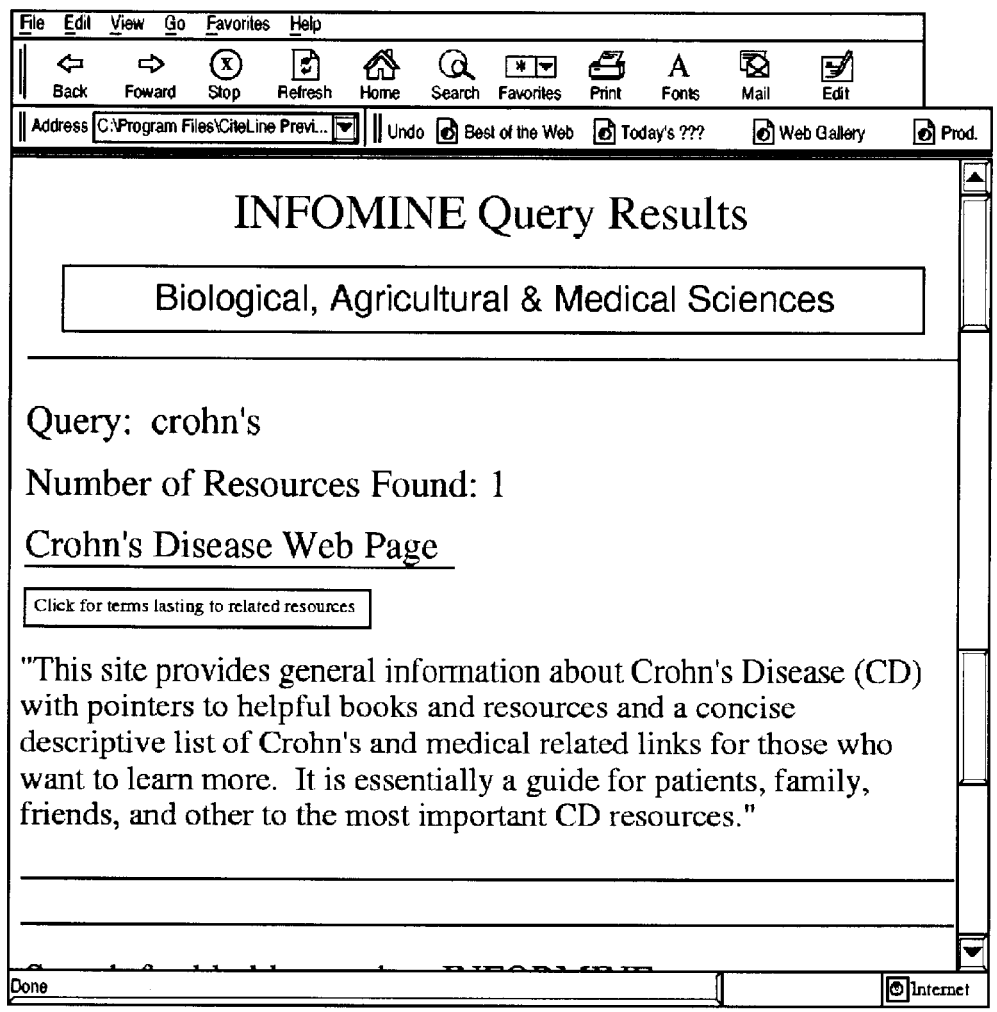
FIG. 4 illustrates a feedback display provided in response to the search requested through the interface illustrated in FIG. 3.

When a site is scheduled to be monitored and an initial query has been executed, providing results such as those illustrated in FIG. 4, client 12 caches HTML (and related graphics) for the initial results page. Subsequent monitor queries triggered at the appropriate time intervals (according to the user's desired schedule) are accomplished by client 12 formatting and sending a query to a database server at a particular database-housing Web site, such as one that might be housed on server 19. The user may choose to limit results processing to preferably between one and twenty sites at a time, although additional simultaneity may be accommodated through the use of accelerated hardware on client 12 and a high bandwidth connection 15 to network 16.

Figure 5:
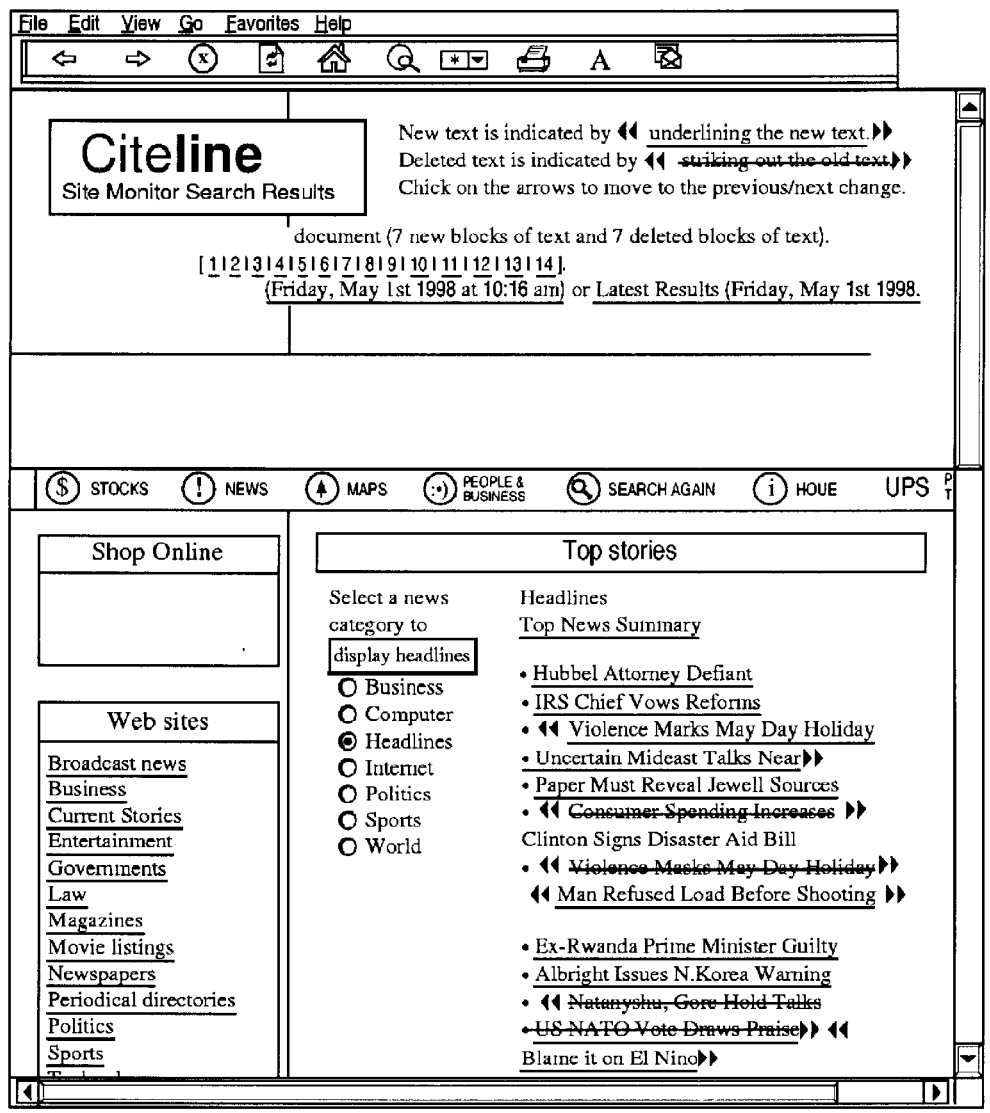
FIG. 5 illustrates a differentiated data feedback display of the present invention.

Client 12 then preferably utilizes a difference algorithm to compare the current query results to HTML results and related graphics, previously cached in a long-term stable memory. Extraneous information such as advertising banners are preferably removed to allow the user to focus on new results. An example of a result comparison HTML display is provided in FIG. 5. If the query results have not changed, client 12 notifies the user. If the query results have changed, client 12 notifies the user and creates an HTML document which displays the differences between the old and new query results and highlights the differences in the body of the text on the most recent HTML results page. The provided results page preferably also provides link elements within the text to navigate between each of the differences and links to view previous and current results. Client 12 then provides the user a mechanism to view results within a browser, and replaces a previously cached HTML results document (and related graphics) with a current results document. The client application finally caches the most recent query results, and provides means for the user to view the most recent results. Client 12 will preferably only compare a newest scheduled search result to a first search or subsequent, most recently changed result.

The preferred process for query comparison and difference display for the visible web is largely similar to the above-described process for hidden databases, save for the difference comparison. If a particular query has not already been executed, client 12 formats and sends the query to server 17 at a next predetermined time interval. Server 17 then sends an HTML result page and results summary document back to client, in response to which client provides to user the usual means for viewing these results in a Web browser, and client caches both an HTML results page and a summary document. At each subsequent monitoring time, client 12 formats and sends both query and a previous result summary document to server 17, which uses the previous summary document and current query summary document to compare current query results to previous results, and sends an HTML-formatted changed results page back to client 12 (thus, the page displays only new or different results, not unchanged results). Client 12 then provides the customary means for the user to view results in a Web browser, and client caches the newest HTML results page and newest summary document for later comparison. Server 17 may also be configured to maintain a user's query and search preferences and run the monitoring functions automatically. Server 17 can then notify user of any changed results by communicating directly with client 12 during the next execution of the application, by email, or by network independent methods such as paging or automated phone notification. Preferably, the user can establish the criteria for triggering a change notification.

Upon inquiry by the user, client 12 preferably displays the monitor times and current monitoring status for each query set to be monitored. Client 12 preferably does not save HTML for the difference results pages, but rather saves only the HTML for the most recently changed results page, which the user can access from a site monitor interface. For visible web monitored query results, the changed results page provides link to HTML page displaying all current results.

Optionally, server 17 can also be configured to run confidential searches. Instead of client 12 issuing the query directly to an invisible web database, the query can be routed through server 17. The result of this operation is that the invisible web database sees the query as issuing from dedicated server 17, not client 12.

In a presently preferred embodiment, application 10 offers a variety of user configuration options to optimize the searching patterns and displayed results for a given user. FIG. 6 shows a listing of the dialogs prompted by the application 10 to guide the user in configuring the application and issuing the searches.

The present invention therefore provides a method and apparatus for simultaneously and intelligently searching and accessing data from otherwise difficult to reach databases. The apparatus preferably includes a single subject database (e.g., a healthcare database, although a plurality of such databases may be resident on a single client) including a hierarchical listing of hidden web databases organized by subject matter. The apparatus further comprises means of access to search engines hosted on a dedicated service provider server, the search engines accessing an index of visible web sites that are particularly relevant to the selected subject matter. Search results are preferably cached on the use's computer, allowing for easy sorting of new and old data and differentiated display to the user.

While the present invention has been described with reference to certain preferred embodiments, those skilled in the art will recognize that various modifications and other embodiments may be provided. Specifically, the invention has been described with a view towards implementations using the internet as the WAN. As such the preferred means of storing and displaying information is in HTML form. However, the invention is suitable for other WAN applications and the specific implementations may be tailored appropriately. Further, a variety of data comparison algorithms may be utilized to increase system throughput and are clearly within the scope and spirit of this description. Such other embodiments are intended to fall within the scope of the present invention. Consequently, the above description is intended to be exemplary only.

What is claimed is:

1. A method for automated searching of a wide area network, comprising the steps of:
   a) maintaining a database of sources of indirectly and directly available information related to a desired subject, wherein the database comprises a plurality of entries, each entry locating a source for indirectly and directly accessible information and each said entry further comprising any necessary search protocol for the source;
   b) issuing a query according to any necessary search protocol to desired sources;
   c) retrieving the results of the query; and
   d) displaying the results.

2. The method of claim 1, further comprising the steps of:
   e) issuing the query to the desired sources after a given time interval;
   f) retrieving the results of the query issued in step e);
   g) comparing the results of the query issued in step e) to the results of the query in step c); and
   h) displaying any changes determined in step g).

3. An apparatus for automated searching of a wide area network comprising a computer connected to the wide area network and a software application resident on the computer that comprises:
   a) a database of sources of indirectly and directly available information related to a desired subject, wherein the database comprises a plurality of entries, each entry listing a source for indirectly accessible information and directly accessible information and each said entry further comprising any necessary search protocol;
   b) instructions for issuing a query according to any necessary search protocol to desired sources;
   c) retrieving the results of the query; and
   d) displaying the results.

4. The apparatus of claim 3, wherein the software application further comprises instructions for comparing the saved results of a first query against the results of a second query.

5. A computer-readable medium containing instructions for controlling a computer to automate searching of a wide area network, by:
   a) maintaining a database of sources of indirectly and directly available information related to a desired subject, wherein the database comprises a plurality of entries, each entry locating a source for indirectly and directly accessible information and each said entry further comprising any necessary search protocol for the source;
   b) issuing a query according to any necessary search protocol to desired sources;
   c) retrieving the results of the query; and
   d) displaying the results.

6. The computer-readable medium of claim 5, further comprising:
   e) issuing the query to the desired sources after a given time interval;
   f) retrieving the results of the query issued in step e);
   g) comparing the results of the query issued in step e) to the results of the query in step c); and
   h) displaying any changes determined in step g).

* * * * *